United States Patent [19]

Doyen

[11] Patent Number: 4,926,394
[45] Date of Patent: May 15, 1990

[54] MONTE CARLO METHOD FOR ESTIMATING LITHOLOGY FROM SEISMIC DATA

[75] Inventor: Philippe M. Doyen, Houston, Tex.

[73] Assignee: Western Atlas International, Inc., Houston, Tex.

[21] Appl. No.: 427,697

[22] Filed: Oct. 27, 1989

[51] Int. Cl.$^5$ .............................................. G01V 1/28
[52] U.S. Cl. ..................................... 367/73; 364/421; 367/38; 367/70
[58] Field of Search ............................ 367/73, 38, 70; 364/421, 578; 340/701

[56] References Cited

U.S. PATENT DOCUMENTS 4,679,174  7/1987  Gelfand ................................. 367/73
4,817,062  3/1989  DeBuyl et al. ........................ 367/73

OTHER PUBLICATIONS

"Stochastic Relaxation, Gibbs Distributions, and the Bayesian Restoration of Images", Geman et al., IEEE Transactions on Pattern Analysis & Machine Intelligence, vol. PAMI—6, #6, Nov., 1984.

Besag, J., University of Durham, U.K. "On the Statistical Analysis of Dirty Pictures", Read before the Royal Satistical Society at a meeting organized by the Research Section on May 7, 1986.

Farmer, C.L., Winfrith Petroleum Technology, U.K., Paper presented at the Joint IMA/SPE European Conference on the Mathematics of Oil Recovery, Robinson College, Cambridge University, July 25-27, 1989.

Primary Examiner—Ian J. Lobo
Attorney, Agent, or Firm—William A. Knox

[57] ABSTRACT

A Monte Carlo statistical method for combining discrete geological measurements of rock properties with continuous measurements of seismic attributes and for converting those combined measurements into a display of the best estimate of subsurface rock classes.

7 Claims, 9 Drawing Sheets

MONTE CARLO METHOD FOR ESTIMATING LITHOLOGY FROM SEISMIC DATA

FIELD OF THE INVENTION

This is a type of Monte Carlo statistical method for estimating a variation in rock type or texture, i.e. the change in lithology, along a given stratum, or a related grouping of strata within a selected geologic formation, from seismic data gathered along an array of survey coinciding with geological control points such as boreholes.

DISCUSSION OF THE PRIOR ART

As is well-known in the art of seismic surveying, an acoustic pulse is generated at or near the surface of the earth. The acoustic pulse propagates as a spherical wave front into the earth. The wave front is reflected from subsurface strata and returns to the surface where the reflected data are detected by geophones or hydrophones as amplitude-modulated or digital electric signals. The signals are stored as time-scale recordings for later processing to produce a seismic cross section of a portion of the earth. In petroleum exploration, seismic data is useful in predicting the depth, attitude and lithology of the rock formations between wells and in finding likely areas for further drilling.

The amplitude of a wave front that is reflected from an interface between two strata, is determined by the reflectivity coefficient which is a function of the difference in the acoustic impedance between the two strata. The acoustic impedance of a stratum is defined as the characteristic velocity within that rock layer (the interval velocity) multiplied by the rock density. Acoustic impedance is measured in units of feet per second per gram per cubic centimeter.

The amplitudes of received and recorded seismic reflections can be measured and corrected for spherical spreading, instrumental artifacts and other predictable variables to yield "true amplitude" data. The acoustic impedances of the respective strata can then be calculated from the amplitude data.

An acoustic impedance profile is useful in estimating the type and extent of certain rock classes and their petrophysical characteristics, along a seismic array of survey such as between oil wells. For example, shales on the average sometimes tend to be characterized by a somewhat greater acoustic impedance than sandstone. However, the rock layers are not necessarily homogeneous throughout their lateral and vertical extent. Dirty sands grade into sandy shales. A change in composition, porosity, permeability of fluid content of a rock mass may cause a concomitant change in the seismic attributes such as true amplitude, acoustic transit time (reciprocal velocity) or acoustic impedance. Thus, a particular value of a seismic attribute, associated with a selected reflecting horizon, is not uniquely diagnostic of the petrophysical characteristics that gave rise to that reflection. The acoustic impedance of sands, shales and other rock types or classes can be measured directly in boreholes by the combined use of gamma ray logs, neutron logs and continuous velocity loggers in conjunction with analyses of core samples. Rock samples from outcrops can be similarly studied. Given a nearby seismic survey, the petrophysical characteristics of the rock types may be correlated directly with seismic attributes.

For example, in FIG. 1, a frequency histogram was constructed showing synthetic seismic transit times as a function of discrete intervals or ranges of permeability for a sample of Berea sandstone. The scatter in the transit-time values produced considerable overlap in the observed data. A histogram of other petrophysical variables within a single stratum, such as porosity or lithology, could be expected to show a similar scatter on an areal basis. A profile of seismic attributes is therefore ambiguous; the degree of ambiguity is proportional to the area of overlap of the frequency distributions.

Measured petrophysical data are known only at control points which may be rather widely scattered within a region. Seismic data may be available at closely-spaced sampling stations within that region but the data are ambiguous with respect to specific rock properties. Given two sources of imperfect data, it is the object of this invention to combine the two sources to probabilistically estimate the true petrophysical properties.

The concept of this invention is based in part on image enhancement techniques as applied to remote sensing, such as described by J. Besag ("On the Statistical Analysis of Dirty Pictures", published in the Journal of the Royal Statistical Society, v. 48, No. 3, 1986). A related method has been described by C. L. Farmer, "The Mathematical Generation of Reservoir Geology" presented July, 1989 at the IMA/SPE European Conference on the Mathematics of Oil Recovery.

SUMMARY OF THE INVENTION

This is a computer-aided Monte Carlo method for combining discrete geological measurements of rock properties with continuous measurements of seismic attributes and for converting those combined physical measurements to a display of the best estimate of subsurface rock classes which are defined as discrete ranges of petrophysical properties or lithologic classes.

In this invention, I provide a method for modeling the petrophysical characteristics of a portion of the subsurface of the earth. I establish the presence of a plurality of discrete rock classes in an earth layer. The spatial transition statistics between the rock classes of an earth layer are measured between discrete, spaced-apart geological control points. Integer values or separate colors are assigned to each rock class for display purposes and to represent the petrophysical properties. A continuous array of seismic stations is laid out between the geological control points. Recordings of selected seismic attributes are made at each seismic station. The attributes are selected on the assumption that they are indicative of the petrophysical properties under study. The means and variances of the selected attributes are calculated for each rock class or petrophysical property. An initial model is created that consists of an N-dimensional array of pixels where N may be 2 or 3. The pixel dimensions are commensurate with the spacing of the seismic stations.

I randomly assign one of at least two possible colors to each pixel of the initial model. A pixel is chosen at random. The global energy of the entire model is calculated for each possible color of the chosen pixel. The global energy is the sum of the likelihood energy and the prior energy. The color assigned to the chosen pixel will be that color for which the total energy is minimized. The process is continued for all pixels in the model. The pixel colors are then iteratively perturbed a plurality of times over all pixels until the global energy is minimized and the model is stabilized.

In accordance with an aspect of this invention, seismic attributes of interest are acoustic impedance, true seismic amplitude and seismic transit time.

In accordance with another aspect of this invention, the likelihood energy is a measure of the misfit between the recorded seismic attributes and the average seismic attributes calculated from the seismic data for each rock class. The prior energy is a measure of the misfit between the spatial transition statistics calculated from geological data and the spatial transition statistics determined from the model.

BRIEF DESCRIPTION OF THE DRAWINGS

These and other benefits of my invention will be better understood by reference to the attached detailed description and the drawings wherein.

DETAILED DESCRIPTION OF THE PREFERRED EMBODIMENT

Figure 1:
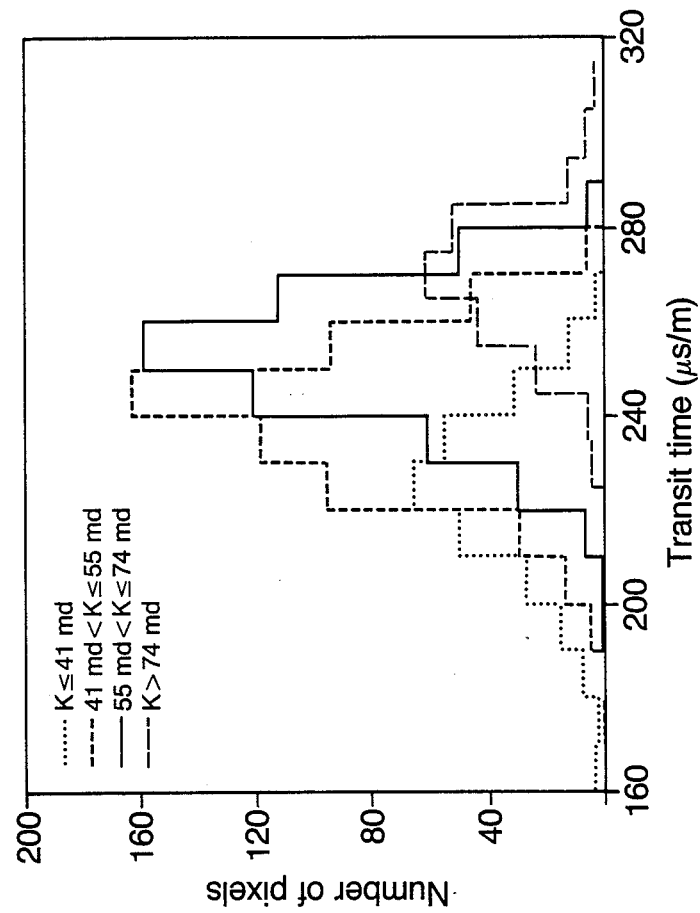
FIG. 1 is a frequency distribution graph of synthetic seismic transit times for discrete ranges of permeability over a sample of Berea sandstone.

From experimental data, such as that gathered from a reconnaissance geological survey or from boreholes, I establish the fact that, for a given rock layer or stratum, there exist variations in the petrophysical characteristics or rock classes within that stratum. Using those data, I provide a statistical petrophysical classification scheme that uses both seismic attributes such as impedance, true amplitude data, or seismic transit times and known information about the spatial variation in petrophysical properties expressed in terms of the frequencies of transition between petrophysical classes as a function of distance. The statistical classification scheme is based upon Bayes' theory, a theory in which probabilities are associated with mutually independent individual events and not merely with frequencies of those events. The maximum a posteriori estimate of the true rock class is then derived from that classification; that is, it is the best estimate of the rock class as derived from observed facts.

Given an N-dimensional region, R, divided into an array of pixels representing data-observation stations, let a petrophysical image of the subsurface be represented by a vector $X^{true} = (x_1^{true}, \ldots, x_n^{true})$ where $x_i$ represents the true rock class at pixel i and n is the total number of picture elements. The variables $x_i$ can take only discrete values from the set $1, 2, \ldots, c$ such as 1 or 2 for sand and shale respectively, by way of example, although additional values 3 or 4 could be introduced such as for limestone or dolomite or, for that matter, ranges of permeability within a single rock type. Alternatively, for purposes of a visual display, one could assign gray levels to the pixels such as black, white, and shades of gray or various spectral colors in place of numeric values.

Associated with each pixel i, there is a seismic record $z_i$. The seismic data vector for the entire image is denoted by $Z = (z_1, \ldots, z_n)$. The number of pixels, n, is commensurate with the total number of samples of the seismic records. Note that the seismic variables $z_i$ are continuous. The physical size of each pixel is therefore commensurate with the seismic station spacing.

The problem is to infer the true petrophysical spatial distribution $X^{true}$, which is usually known only at control points as stated supra such as boreholes, from the measured seismic vector Z. The estimate $Z^{est}$ of the true petrophysical vector $X^{true}$ is chosen to have the maximum probability given the seismic data Z. Applying Bayes' rule, $$p(X|Z) \propto p(Z|X) p(X), \tag{1}$$

The probability of X given the seismic data Z, is to be maximized with respect to X. The estimate $X^{est}$ is the maximum a posteriori (MAP) estimate of the true value $X^{true}$.

Assuming conditionally independent Gaussian seismic impedance records (or records of some other attribute), the conditional probability $p(Z|X)$ can be written as $$p(Z|X) \propto \exp(-E_l), \tag{2}$$

where $E_l$ is the likelihood energy defined as $$E_l(x_1, \ldots, x_n) = \sum_{i=1}^{n} \frac{[z_i - \mu(x_i)]^2}{2\sigma_l^2(x_i)}. \tag{3}$$

The likelihood energy may be seen as a measure of the misfit between the recorded seismic attributes and the average seismic attributes of each rock class. In (3), $\mu(x_i)$ and $\sigma_l^2(x_i)$ represent the mean and variance respectively of an attribute such as impedance for type x, pixels which may equal 1 or 2 or some other integer (black, white or some other color) depending upon the rock class at pixel i. The means and variances can be estimated from a frequency distribution graph of the parameter under study, such as is shown in FIG. 1 which is a frequency distribution diagram of seismic transit times for various ranges of permeability.

In (1), p(X) is the prior distribution model which is constructed from experimental frequencies of transition between petrophysical classes, as a function of horizontal and vertical distances u and v respectively, which may, for example, be measured in terms of pixel units. Let r and s be the values of rock class variables $x_i$ and $x_j$ at any pairs of pixels i and j, separated (in pixel units) by a distance vector (u, v) in the plane of the seismic section, assuming a two-dimensional example. By definition supra, r and s are integers equal, for example, to 1 or 2. For a given distance vector (u, v), separating a pair of pixels i and j, the quantity $N_{rs}(u, v)$ is defined as the number of pairs of pixels i-j in the image such that pixel i belongs to rock class r and pixel j belongs to class s.

Using the above definition for $N_{rs}(u, v)$, the prior distribution is specified by $$p(X) \propto \exp(-E_p), \tag{4}$$

where $$E_p(x_1,\ldots,x_n) = \sum_{u,v} \sum_{r,s=1}^{c} \frac{[N_{rs}(u,v) - N_{rs}^{true}(u,v)]^2}{2\sigma_p^2}. \quad (5)$$

In (5), $N_{rs}^{true}$ represents the transition statistics expected for the true petrophysical image $X^{true}$, $N_{rs}$ denotes the transition statistics associated with an arbitrary rock class image X and c is the total number of possible colors or rock types. The quantity $E_p$ is called the prior energy, that is the energy that is attributed, as being known, to a rock class image a priori. $E_p$ is a measure of the misfit between the spatial transition statistics derived from the known geology at control points and the spatial transition statistics of the model X.

From (4) and (5), it is apparent that low energy or high probability, is given to images for which the transition statistics are close to their expected values $N_{rs}^{true}$ and vice-versa. The variance parameter $\sigma_p^2$ in (5) controls the magnitude of the energy $E_p$. It is a user-defined parameter which reflects the degree of reliability of the statistics $N_{rs}^{true}$. If $\sigma_p^2 \to 0$, great confidence in the data is implied; $\sigma_p^2 \to \infty$ implies worthless data. In practice, the dimensions of $\sigma_p^2$ are commensurate with the magnitude of the statistics of the $N_{rs}^{true}$.

In (5), the first summation extends over all distances u and v for which the transition statistics $N_{rs}^{true}$, from, for example, black to white, white to black, white to white, etc., are available. It should be remembered that, although seismic data are usually available at closely-spaced regular increments of distance, u and v, the real data for determining $N_{rs}^{true}$ may be sparse and available only at discrete control points which may be widely separated.

From the exponential definitions for p(X) and p(Z|X) in (2) and (4), and from (1), it is clear that finding the MAP estimate $X^{est}$ of the true petrophysical properties $X^{true}$ is equivalent to finding a petrophysical model X that minimizes the total of global energy E:

$$E(X) = E_l(X) + E_p(X), \quad (6)$$

Figure 2:
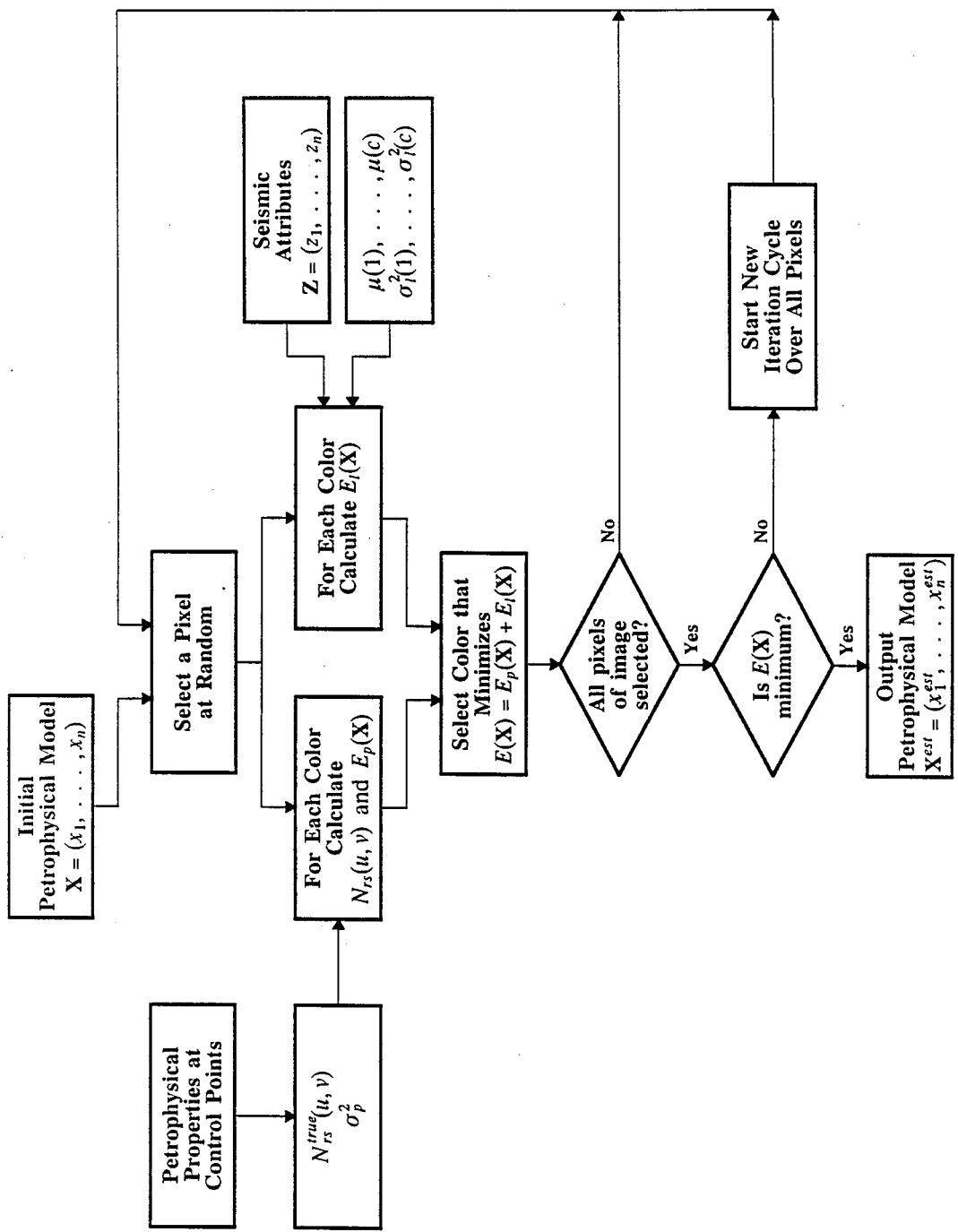
FIG. 2 is a flow diagram of the computer aided process of this invention.

Minimization of the objective function E(X) in (6) is achieved by a computer-aided iterative routine shown schematically in the flow diagram of FIG. 2 which will be used to explain the best mode of operation, in conjunction with FIGS. 3-9. For purposes of this explanation, we shall refer to "colors" rather than to integers, with the integer 1 being assigned the color white (if gray levels are used) by way of example but not by way of limitation.

Referring now to the flow diagram of FIG. 2, we first create an initial N-dimensional petrophysical model which may be an array of randomly colored pixels. In FIG. 2, N=2 by way of example but not by way of limitation. The pixels may take on any of several possible colors. From the known petrophysical and seismic data, the means $\mu$ and variances $\sigma_l^2$ for each color (equation (3)) are computed and stored. Similarly, the spatial transition statistics $N_{rs}^{true}(u,v)$ are generated from known geologic data for each possible color at geological control points.

A pixel i is chosen at random from the initial model. The likelihood energy, $E_l$, is calculated from the mean and variance for that pixel color. The spatial transition statistics for the model $N_{rs}(u,v)$ are calculated for each u and v and each possible value of r and s, compared with $N_{rs}^{true}$ to compute the prior energy $E_p$. $E_p$ and $E_l$ are summed to determine the global energy E(X). The color assigned to the chosen pixel will be that color for which the global energy is minimized. The process is continued for all pixels in the model.

Additional global iteration cycles are executed perturbing the pixel coloring over all pixels until the global energy E(X) converges to a minimum and the model becomes stabilized. Generally less than fifteen iteration cycles are required for convergence.

The method of my invention will be better understood by reference to FIGS. 3-9 which may be used to exemplify but not to limit my presently-preferred method.

Figure 3:
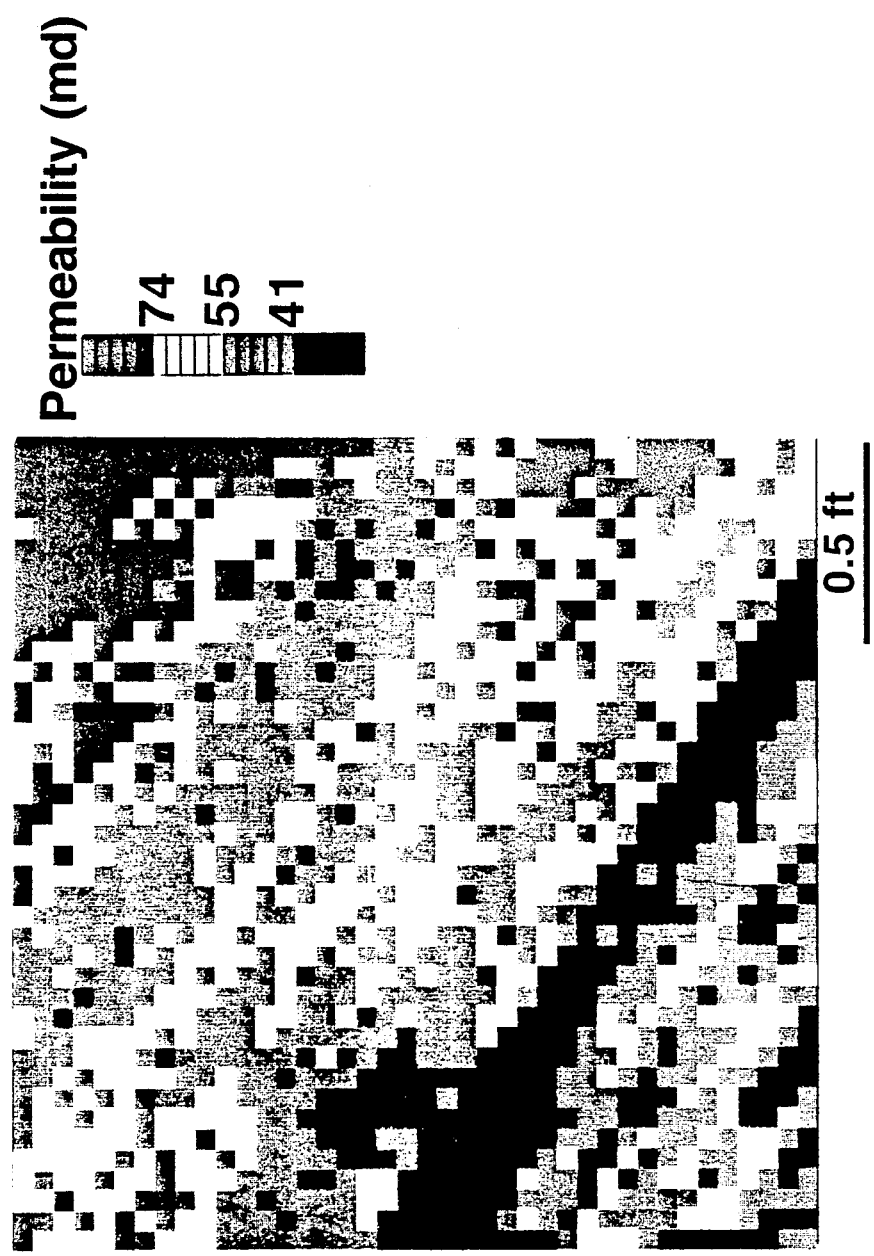
FIG. 3 illustrates the true distribution in two dimensions of the measured permeability ranges over the above sample.

FIG. 3 shows a two-dimensional array of pixels that represent actual cores cut from a slab of Berea sandstone. The permeability of each core was measured and assigned a color that corresponds to a discrete interval or range of permeability, measured in milli-darcys, as shown by the color chart at the upper right of the array. For purposes of this example, the respective cores serve as a plurality of geological control points from which the statistics $N_{rs}^{true}$ were calculated.

Figure 4:
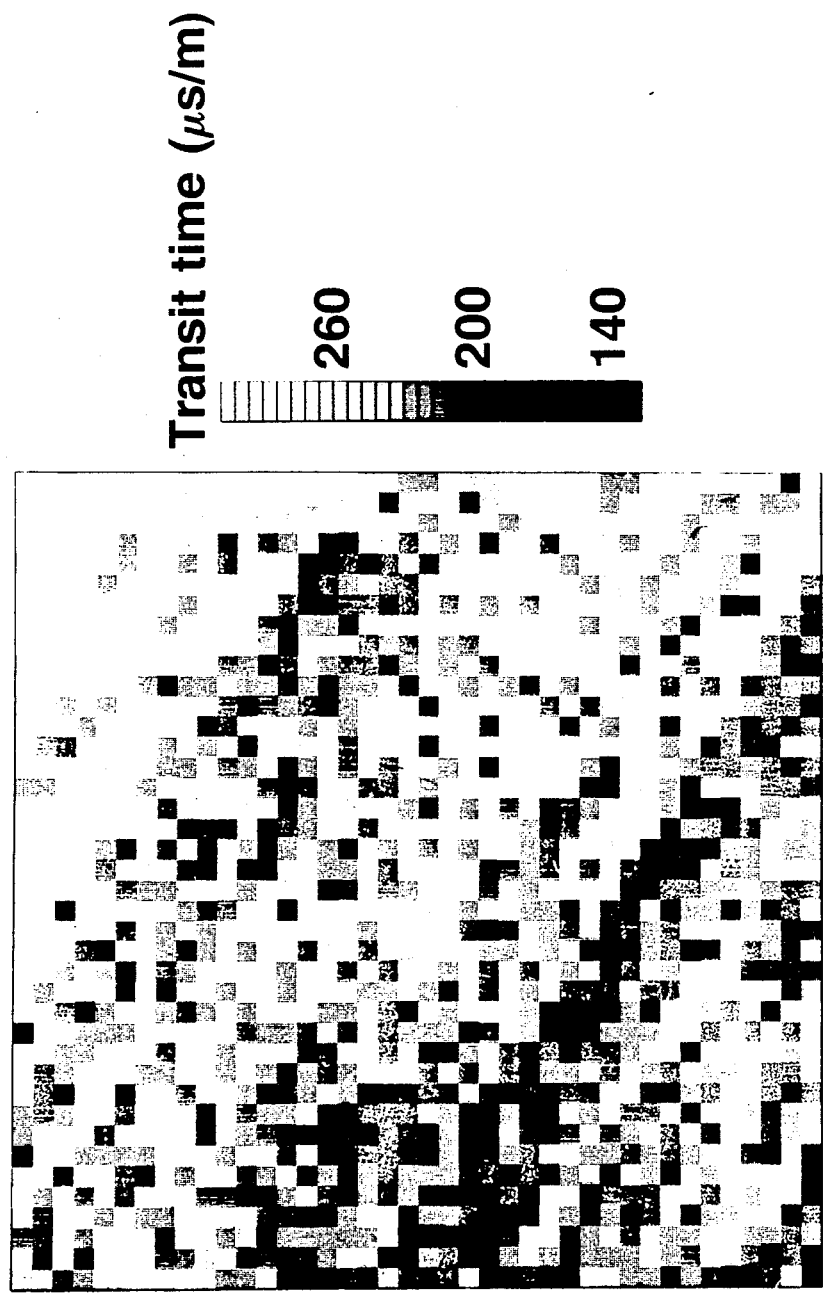
FIG. 4 is a synthetic display of a certain seismic attribute, expressed in terms of seismic transit times per pixel, derived from the measured permeability values.

In FIG. 4, I show discrete ranges of a synthetic seismic attribute, namely seismic transit time measured in $\mu$s/m, for each pixel. In this synthetic example, the transit time data establish a continuous array of seismic stations between the geological control points. The transit times are indicative of the rock classes represented by the permeability ranges. From FIG. 2 we see that there is considerable overlap in range.

Figure 5:
FIG. 5 is the initial random model.

FIG. 5 is the initial model as created in the flow diagram of FIG. 2. The pixels are randomly colored.

Figure 6:
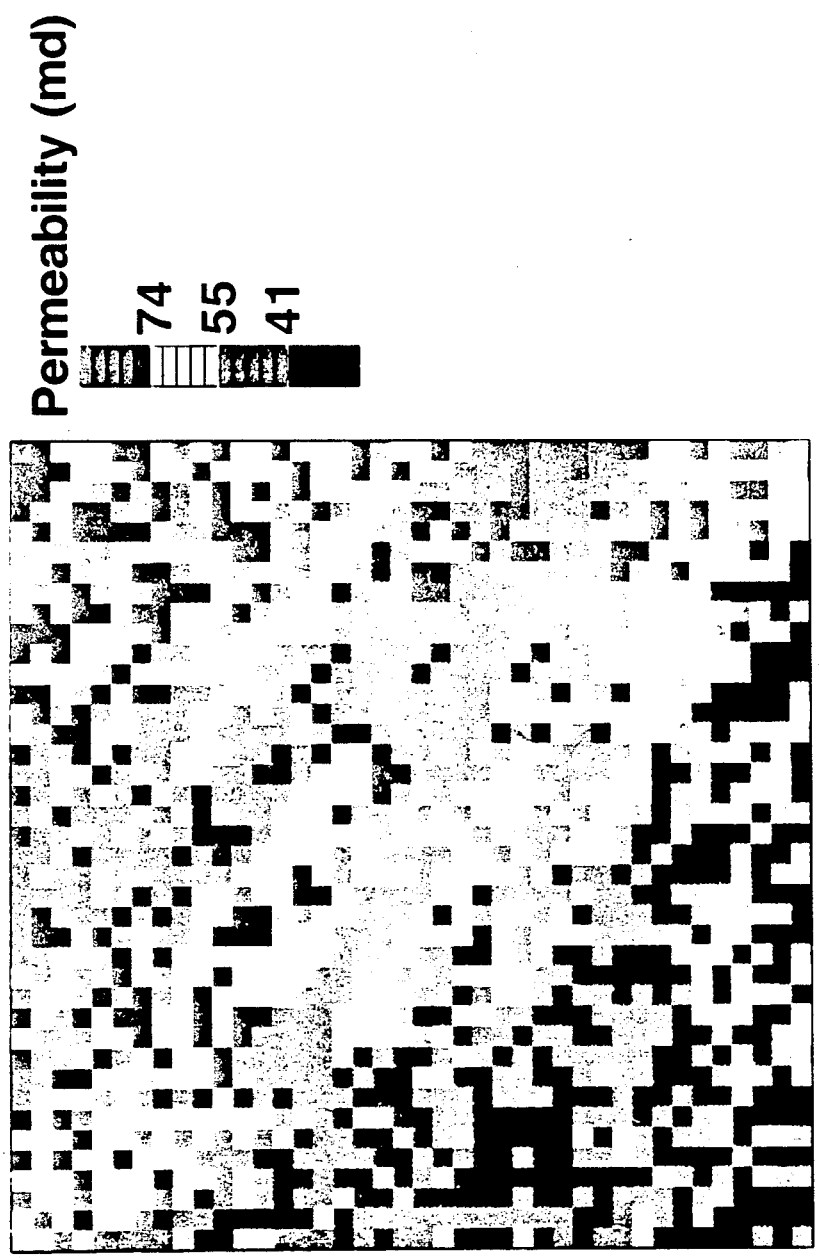
FIG. 6 is the MAP reconstruction from seismic and geological data after the first iteration.

FIG. 6 shows the model after completion of the first global iteration cycle. During that process, the colors of 1163 pixels were swapped. After the first global iteration, the calculated global energy amounts to 3305. The percentage of misclassified pixels amounts to 57%.

Figure 7:
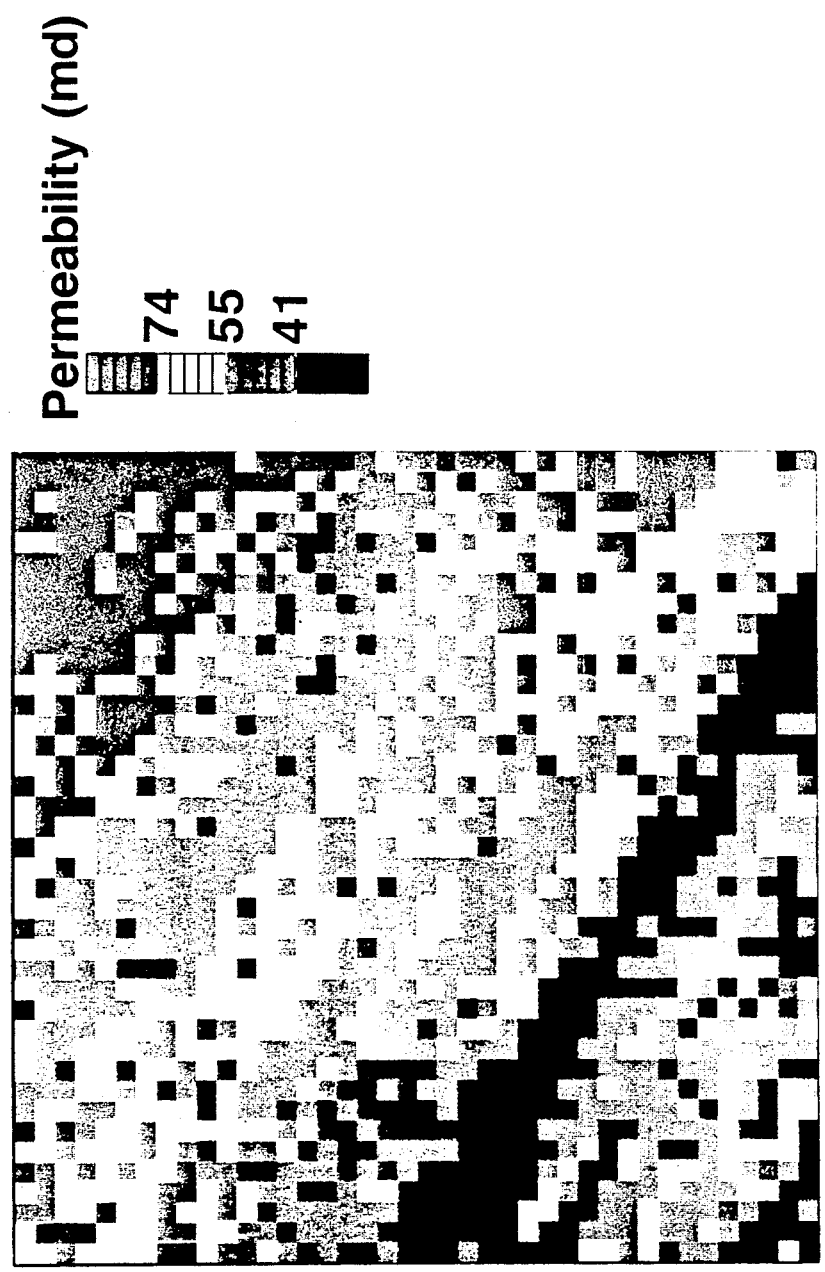
FIG. 7 is the reconstruction after the third iteration.

FIG. 7 is the picture after 3 global iterations. The value of E is reduced to 1102 after some 267 pixels colors have been exchanged. The error rate has been reduced to 36%.

Figure 8:
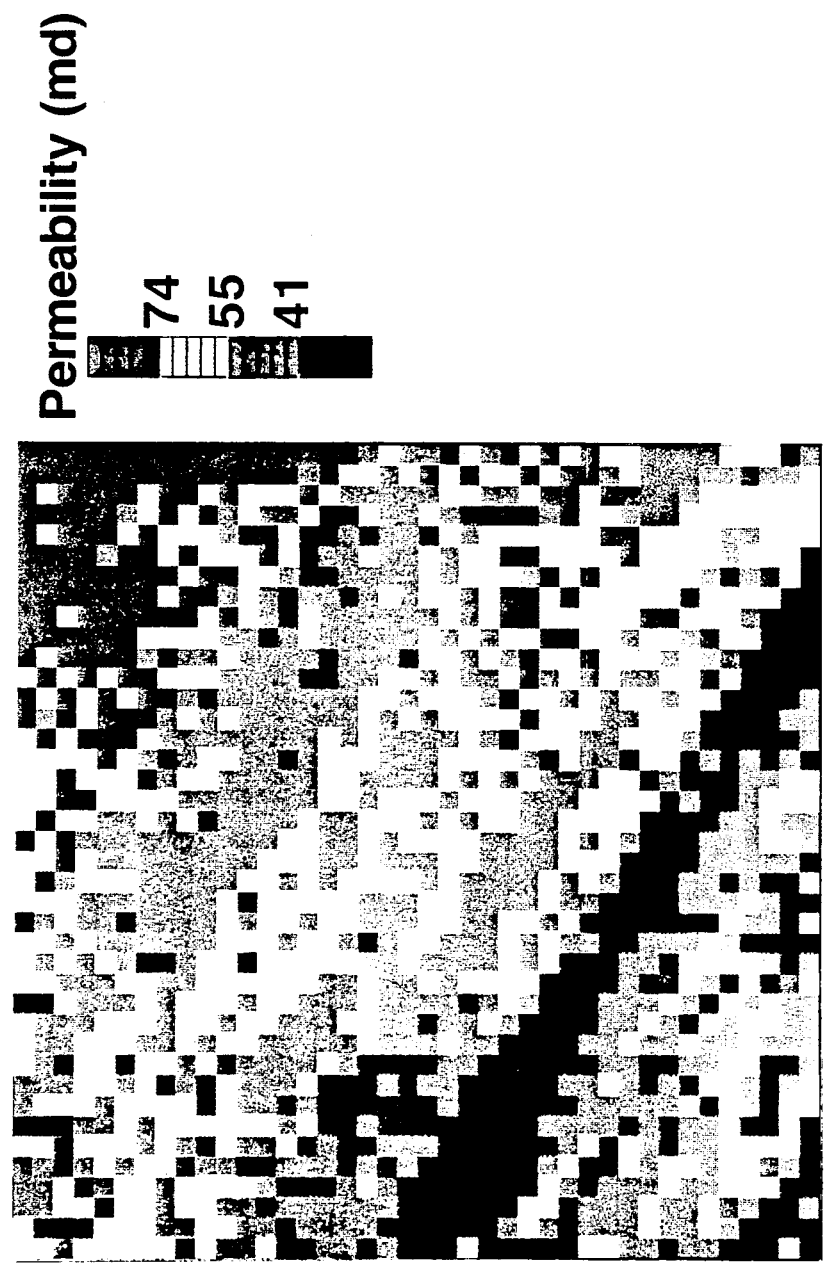
FIG. 8 shows the appearance of the model after the fifth iteration.

The results of the fifth global iteration are shown in FIG. 8. The initial model is stabilizing in that the value of E, 982 has not changed very much from the previous value of 1102.

Figure 9:
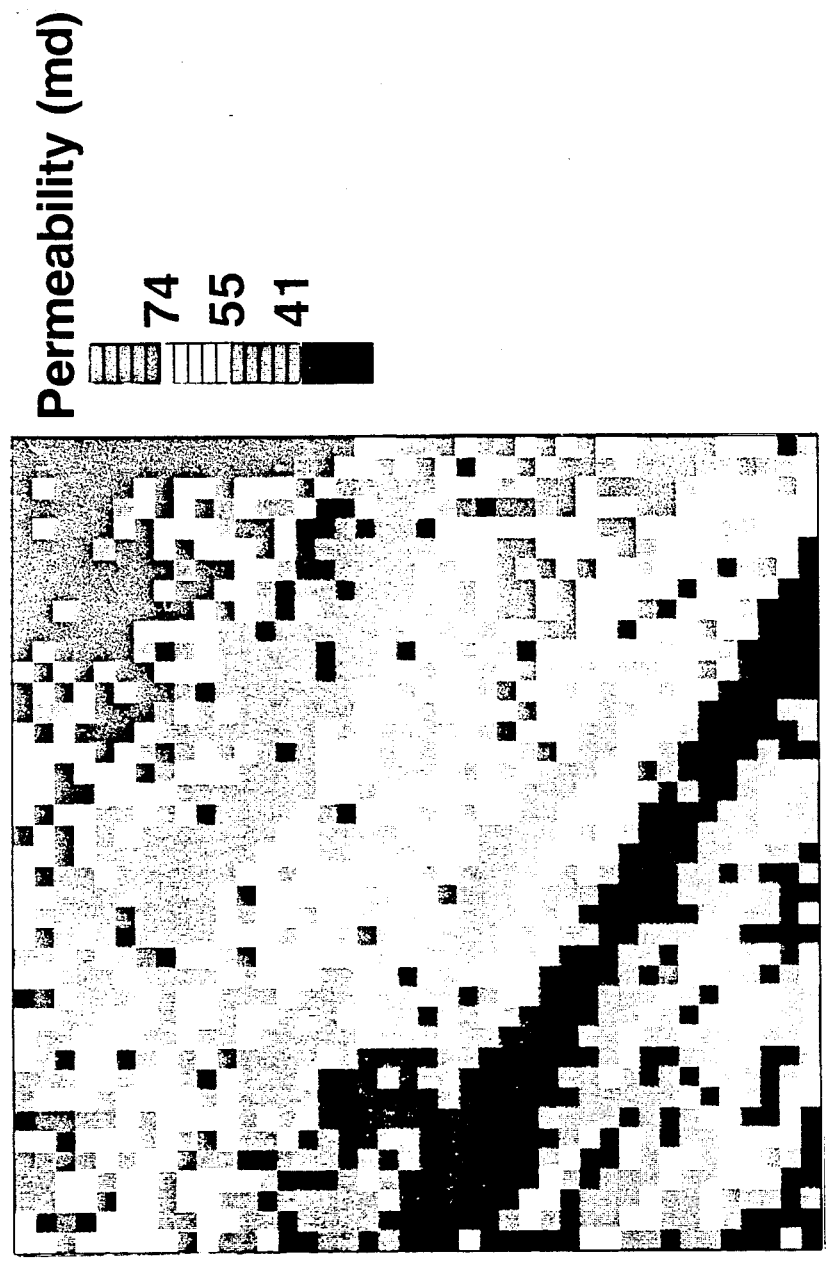
FIG. 9 is the final model after eleven iterations.

By the eleventh global iteration FIG. 9, E has diminished to 950. For all practical purposes, the initial model has now stabilized; it is unlikely that any additional global iterations would improve matters significantly. After the final iteration, the misclassification rate is 33%. It is to be understood that the synthetic example presented is somewhat idealized in order to demonstrate more clearly, the overall process. Under actual field conditions, it is unlikely that the geological control points would be as densely spaced relative to the seismic data, as shown here.

Those skilled in the art will recognize that certain variations may be made in the process and displays described herein but which will fall within the scope and spirit of this invention which is limited only by the appended claims.

I claim as my invention:

1. A method for modeling a continuous profile of the petrophysical properties of subsurface earth layers, comprising:

establishing the presence of, and measuring the petrophysical properties of a plurality of geologic rock classes in an earth layer, said rock classes including discrete ranges of petrophysical properties;

assigning one of at least two possible colors to each said rock class;

measuring the spatial transition statistics between said rock classes in said earth layer between a plurality of spaced-apart geological control points;

providing a continuous array of seismic stations between said plurality of spaced-apart geological control points, and recording seismic attributes that are indicative of the petrophysical properties of said rock classes;

calculating the means and variances of said seismic attributes for each said rock class;

creating an initial model of the substrate earth layers consisting of an N-dimensional array of pixels and randomly assigning one of at least two possible colors to each said pixel of said initial model;

choosing a pixel at random from said array;

for each possible color of said pixel, calculating the likelihood energy and the prior energy;

summing the likelihood energy and the prior energy to evaluate the global energy;

selecting the one of said at least two possible pixel colors that minimizes the global energy;

repeating the steps of choosing, calculating, summing and selecting for every other pixel in the array that forms the initial model thereby completing a first global iteration cycle;

executing additional global iteration cycles by perturbing the pixel coloring over all pixels until the global energy converges to a minimum to provide a final model; and displaying said model.

2. The method as defined in claim 1, wherein:
said seismic attribute is seismic impedance.

3. The method as defined by claim 1, wherein:
said seismic attribute is true amplitude.

4. The method as defined in claim 1, wherein:
said seismic attribute is seismic transit time.

5. The method as defined by claim 1, wherein:
said likelihood energy is a measure of the misfit between the recorded seismic attributes and the average seismic attributes calculated for each rock rock class from said seismic data.

6. The method as defined by claim 1, wherein:
said prior energy is a measure of the misfit between the spatial transition statistics calculated from geological data and the spatial transition statistics determined from the model.

7. The method as defined in claim 1, wherein:
the physical size of each said pixel is commensurate with the spacing of said seismic stations.

* * * * *